(12) United States Patent
Dowling et al.

(10) Patent No.: US 7,868,888 B2
(45) Date of Patent: Jan. 11, 2011

(54) COURSE GRID ALIGNED COUNTERS

(75) Inventors: Terence S. Dowling, San Jose, CA (US); R. David Arnold, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 490 days.

(21) Appl. No.: 11/541,219

(22) Filed: Sep. 29, 2006

(65) Prior Publication Data

US 2007/0188499 A1 Aug. 16, 2007

Related U.S. Application Data

(60) Provisional application No. 60/813,588, filed on Feb. 10, 2006.

(51) Int. Cl.
*G06T 11/00* (2006.01)
(52) U.S. Cl. ...................................................... 345/471
(58) Field of Classification Search ...... 345/467–472.2; 358/1.1
See application file for complete search history.

(56) References Cited

U.S. PATENT DOCUMENTS

| | | | |
|---|---|---|---|
| 4,675,830 A | | 6/1987 | Hawkins |
| 4,785,391 A | | 11/1988 | Apley et al. |
| 4,907,282 A | | 3/1990 | Daly et al. |
| 4,959,801 A | | 9/1990 | Apley et al. |
| 5,050,103 A | * | 9/1991 | Schiller et al. ............... 345/469 |
| 5,105,471 A | | 4/1992 | Yoshida et al. |
| 5,241,653 A | * | 8/1993 | Collins et al. ................ 345/668 |
| 5,301,267 A | * | 4/1994 | Hassett et al. ................ 345/469 |
| 5,577,170 A | * | 11/1996 | Karow ........................ 358/1.11 |
| 5,857,067 A | * | 1/1999 | Hassett et al. ............ 345/469.1 |
| 5,929,866 A | | 7/1999 | Arnold |
| 5,943,063 A | * | 8/1999 | Dowling ...................... 345/471 |
| 5,995,086 A | | 11/1999 | Dowling et al. |
| 6,563,502 B1 | | 5/2003 | Dowling et al. |
| 6,597,360 B1 | * | 7/2003 | Stamm et al. ............... 345/469 |
| 6,954,216 B1 | | 10/2005 | Dowling et al. |
| 6,975,332 B2 | | 12/2005 | Arnold et al. |

(Continued)

FOREIGN PATENT DOCUMENTS

EP 0 397 299 A2 11/1990

(Continued)

OTHER PUBLICATIONS

Sole, "International Search Report and Written Opinion", European Patent Office, cited in co-pending PCT application No. PCT/US2007/061807, Jul. 23, 2007, 11 pages.

(Continued)

*Primary Examiner*—Ulka Chauhan
*Assistant Examiner*—Donna J Ricks
(74) *Attorney, Agent, or Firm*—Fish & Richardson P.C.

(57) ABSTRACT

Methods and apparatus implementing and using techniques for scaling a character having stems. A character including stems and having an associated output resolution and an associated bit depth can be received. The counters defined by the stems can be grouped into one or more chains of counters. The stems of the character can be aligned based on a stem alignment policy while the chains of counters are balanced based on the output resolution. A pixel map can be created at the output resolution and the output bit depth based on the aligned stems.

6 Claims, 15 Drawing Sheets

U.S. PATENT DOCUMENTS

| | | | |
|---|---|---|---|
| 7,002,597 B2 | 2/2006 | Arnold et al. | |
| 7,289,123 B2 * | 10/2007 | Duggan et al. | 345/469 |
| 7,425,960 B2 * | 9/2008 | Dowling et al. | 345/467 |
| 7,598,955 B1 * | 10/2009 | Dowling et al. | 345/469 |
| 2003/0214539 A1 * | 11/2003 | Iwema et al. | 345/861 |
| 2003/0218694 A1 | 11/2003 | Wang et al. | |
| 2004/0212620 A1 | 10/2004 | Dowling et al. | |
| 2004/0227770 A1 | 11/2004 | Dowling et al. | |
| 2005/0149882 A1 * | 7/2005 | Iwema et al. | 715/860 |
| 2005/0219247 A1 | 10/2005 | Arnold et al. | |
| 2005/0219248 A1 | 10/2005 | Arnold et al. | |
| 2005/0259111 A1 | 11/2005 | Dowling et al. | |

FOREIGN PATENT DOCUMENTS

WO      WO 01/78053      10/2001

OTHER PUBLICATIONS

Adobe Systems Incorporated, "Adobe Type 1 Font Format", 1990, downloaded from the internet at http://partners.adobe.com/public/developer/en/font/T1_SPEC.PDF, on Feb. 21, 2006, 111 pgs.

Dowling, et al. "Down-Sampling for Display Devices with Colored Subpixels", U.S. Appl. No. 09/785,840, filed Feb. 16, 2001.

Dowling, et al. "Hinted Stem Placement on High-Resolution Pixel Grid", U.S. Appl. No. 09/739,587, filed Dec. 15, 2000.

Dowling, et al. "Glyph Adjustment in High Resolution Raster While Rendering", U.S. Appl. No. 11/226,921, filed Sep. 13, 2005.

Dowling, et al. "Glyph Outline Adjustment While Rendering", U.S. Appl. No. 11/226,909, filed Sep. 13, 2005.

Dowling, et al. "Winding Order Test for Digital Fonts", U.S. Appl. No. 11/226,911, filed Sep. 15, 2005.

Communication pursuant to Article 94(3) EPC, European Patent Application No. 07 756 744.4-2205, Mar. 30, 2010, EPO, 5 pages.

R.D. Hersch, Character Generation Under Grid Constraints, Computer Graphics, vol. 21, No. 4, Jul. 1987, pp. 243-252.

R. D. Hersch, Outline Phase Control for Character Rasterization, Proceedings of Eurographics '88, Elsevier Science Publishers (North-Holland), 1988, pp. 393-404.

* cited by examiner

COURSE GRID ALIGNED COUNTERS

CROSS-REFERENCE TO RELATED APPLICATIONS

This application claims benefit of U.S. Provisional Application No. 60/813,588, filed Feb. 10, 2006, which is incorporated herein by reference in its entirety.

BACKGROUND

The present disclosure relates to the rendering of complex characters for display on multi-tone devices. A multi-tone device is a device capable of displaying a range of tones greater than two. Examples of multi-tone devices include grayscale and color devices.

A complex character is a graphical token or symbol that contains more than one vertical or horizontal stroke (commonly referred to as a stem). Examples of complex characters include Chinese hanji, Japanese kanji, and Korean hanja and hangul characters. Other examples of complex characters include Western and non-Western characters that have multiple strokes.

When rendering a complex character for display on an output device, it is beneficial to consider the white spaces of the character. These white spaces (commonly referred to as counters) are defined as the areas between the stems of the character. By balancing the widths of these counters, an improved representation of the complex character can be achieved.

Conventional techniques for balancing the counters of a complex character in a mono-chromatic, non-grayscale rendering process are not generally compatible with a complex character rendered for display on a multi-tone device. Conventional techniques for aligning the stems of a character according to a stem-alignment policy do not generally consider the importance of balancing the counters of a character.

A technique for balancing the counters of a complex character in a mono-chromatic, non-grayscale rendering process is set forth in U.S. Pat. No. 5,050,103 (the '103 patent) assigned to Adobe Systems Incorporated of San Jose, Calif. A technique for rendering a character for display on a grayscale device is described in U.S. Pat. No. 5,943,063 (the '063 patent) assigned to Adobe Systems Incorporated of San Jose, Calif. The '063 patent aligns the stems of the character according to a stem-alignment policy.

SUMMARY

In general, in one aspect, the invention provides methods and apparatus, including computer program products for rendering characters for output on a multi-tone device. A character including stems and having an associated output resolution and an associated bit depth can be received. The counters defined by the stems can be grouped into one or more chains of counters. The stems of the character can be aligned based on a stem alignment policy while the chains of counters are balanced based on the output resolution. A pixel map can be created at the output resolution and the output bit depth based on the aligned stems. According to another aspect, a system for scaling a character having stems can include a processor and a computer readable medium encoding a computer program product, including a document handling application, operable to cause the processor to perform the operations described.

Advantageous implementations of the invention include one or more of the following features. The stem alignment policy can be a hard-edge policy, a soft-edge policy, a black-edge policy, a minimum-bias policy, or a directional-edge policy. The directional edge policy can align the stems of the character to the output resolution in a bias direction consistent with an orientation of the stems. The aligning of the stems and the balancing of the chains of counters can be based on an expansion factor. The expansion factor can be between 5% and 7%. The output resolution can be a horizontal output resolution and a vertical output resolution.

Particular embodiments of the invention can be implemented to realize one or more of the following advantages. The relative widths of stems and counters in complex characters can be preserved when the characters are rendered on an output device. The readability of complex characters can be enhanced while blurriness is reduced. The counters and stems of complex characters can be more distinctive which improves the visual appeal and recognizability of the characters. Complex characters can be downsampled to lower resolutions while maintaining readability.

Embodiments of the invention can avoid the blurriness and low readability created by a serial application of stem alignment and counter balancing. Embodiments of the invention can create complex characters that appear less blurry or washed out, and that have both well defined and readily recognizable counters. This can be of particular benefit with Chinese hanji, Japanese kanji, and Korean hanja and hangul characters having many stems and counters.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
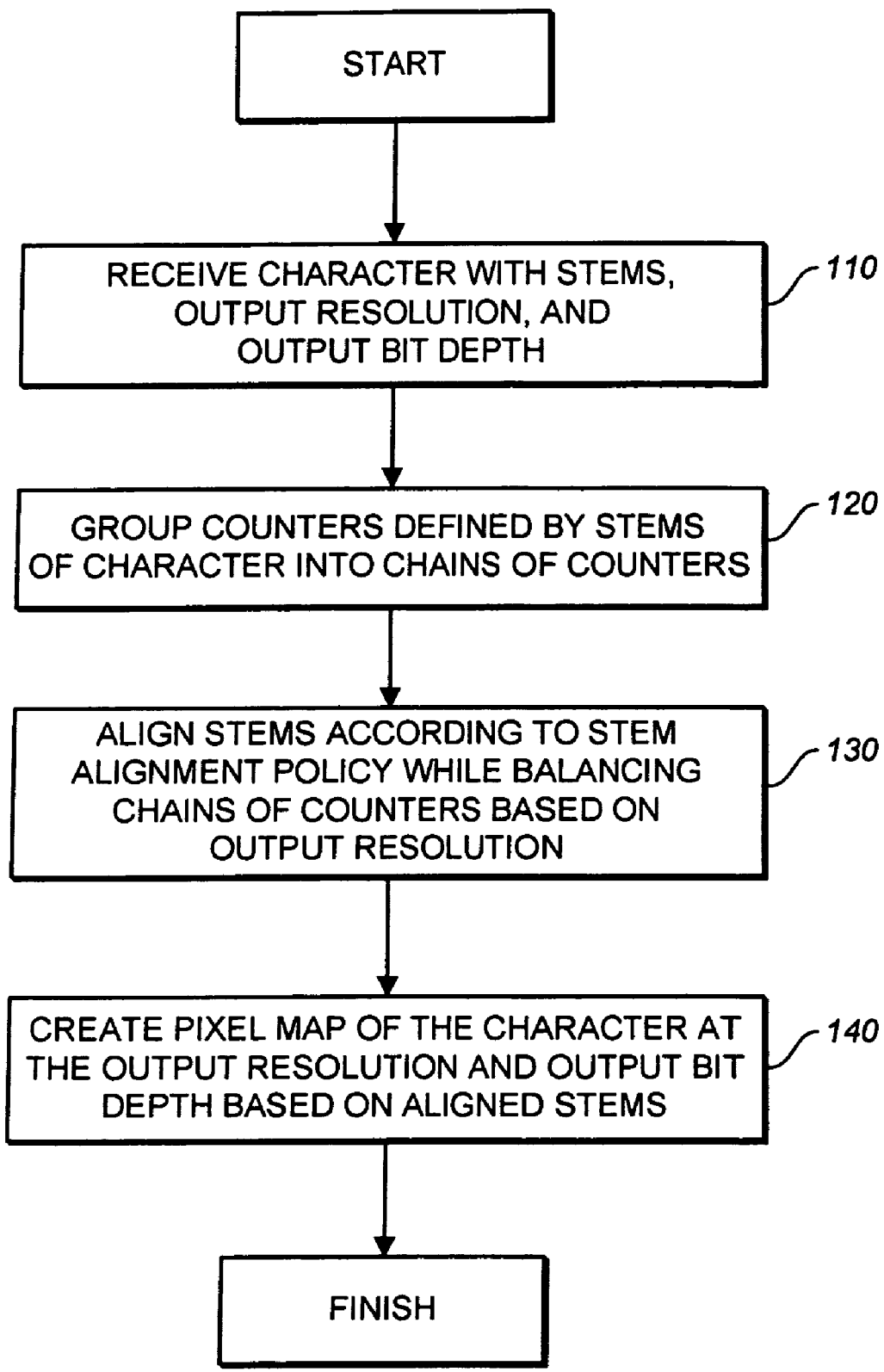
FIG. 1 is a flow chart showing a method for scaling a character having stems.

The present disclosure relates to a method of scaling characters for output on a multi-tone device. For ease of explanation, the following examples scale characters for output on a grayscale device. The methods described can also be applied to color devices. As an example, FIG. 1 is a flow chart showing a method for scaling a character having stems for output on a grayscale device. A process responsible for scaling the characters can receive at 110 the character with stems, an output resolution, and an output bit depth. Examples of such a process include a document handling application, a character rendering routine, and a general purpose rasterizer. The inputs can be passed to the process or can be already contained in the process. The white spaces between the stems of the characters, i.e., the counters, can be grouped at 120 into chains. The counters and chains are conventionally divided into two groups: vertical and horizontal. The stems of the character can be aligned at 130 according to the stem alignment policy while the chains of counters are concurrently balanced based on the output resolution. A pixel map at the output resolution and bit depth can be created at 140 of the character based on the aligned stems. This pixel map can be passed to another process for further processing or use, or it can be rendered to the output device.

When conducting stem alignment there are several stem-alignment policies that can be used. Conventional policies include a hard-edge policy, a soft-edge policy, a black-edge policy, and a minimum-bias policy.

A hard-edge policy aligns both edges of the stem to coarse grid boundaries. While this policy yields crisp strokes, it has the disadvantage that stem widths can become too highly quantized and can result in characters that appear uneven, overbold, or underbold.

A soft-edge policy aligns at least one edge of the stem to a coarse grid boundary. This policy also involves the aligned edge being towards the outside of the character. In that way, both the top and bottom edges of the character are aligned to the coarse grid and any gray pixels point towards the center of the character.

A black-edge policy aligns at least one edge of the stem to a coarse grid boundary. This policy minimizes the movement of the stem center while retaining at least one coarse grid aligned edge.

A minimum-bias policy is a modification of the black-edge policy that applies to stems greater that one device pixel, but less than two device pixels in width. Under the minimum-bias policy, these stems are not aligned with the coarse grid. The result is that both device pixels remain gray rather than making one of them black and the other one a lighter shade of gray, as would happen under the black-edge policy.

Figure 2A:
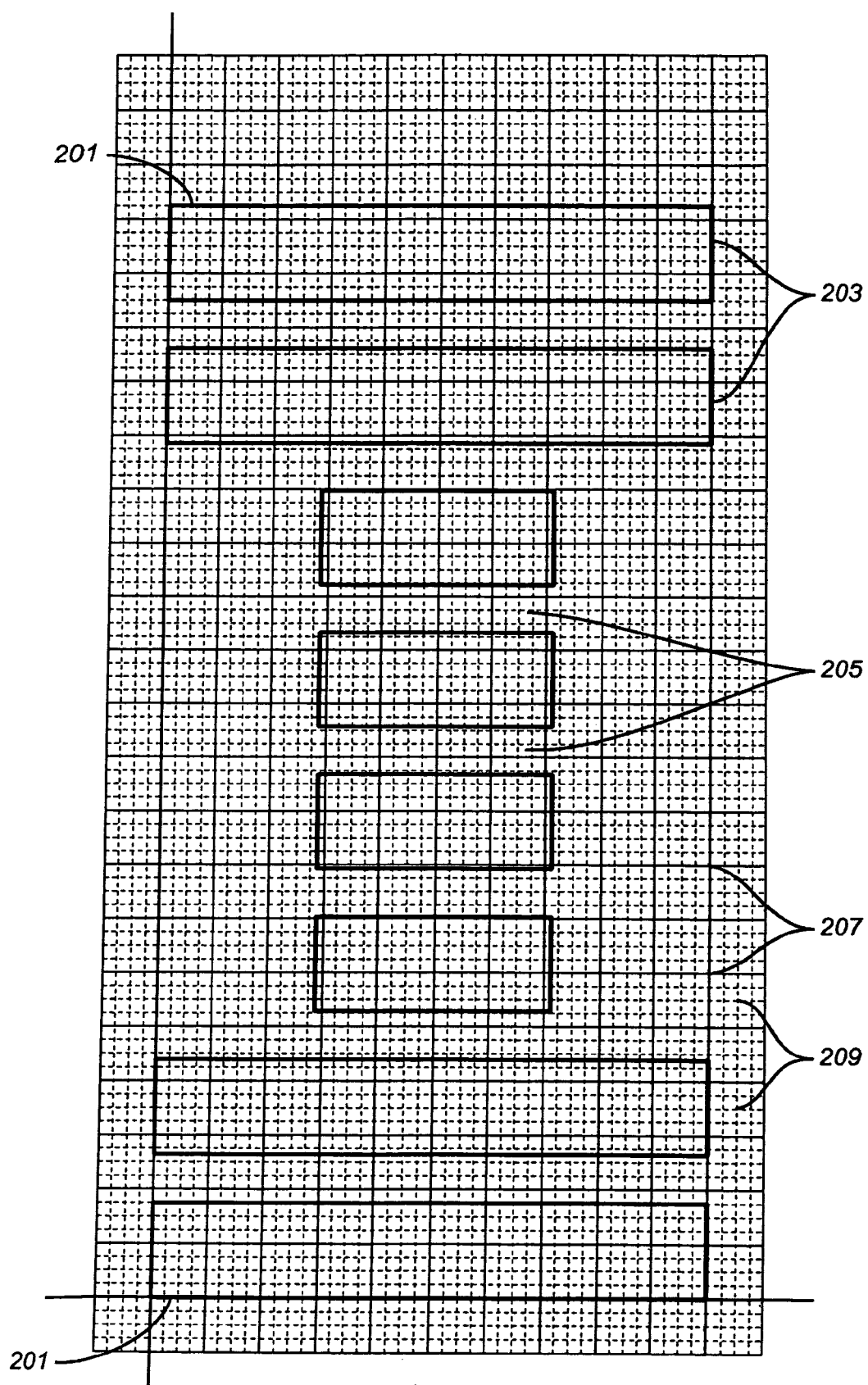
FIG. 2A is an outline of an uppercase "I" having several horizontal stems and counters.

The following example shows the method described above applied to a stylized uppercase "I". FIG. 2A is an outline of an uppercase "I" 201 having several horizontal stems and counters. The stylized uppercase "I" 201 has 8 horizontal stems 203. The white spaces between these horizontal stems define 7 horizontal counters 205. Conventional non-stylized uppercase "I" characters often have between 1 and 3 stems and no counters. Uppercase "I" 201 is a complex character with multiple stems and counters that was created to illustrate the techniques described below. The distortion in the stems and counters of the uppercase "I" during the scaling and rendering process following conventional methods can be reduced. This example is also applicable to other complex characters such as Chinese hanzi, Japanese kanji, and Korean hanja and hangul characters. The teachings of the present disclosure related to the horizontal stems 203 and the horizontal counters 205 are equally applicable to vertical stems and vertical counters.

The uppercase "I" 201 is superimposed on two grids. The first grid 207 is defined by the solid lines and corresponds to the output resolution (this grid is also called the "coarse grid"). The second grid 209 is defined by the dotted lines and corresponds to the high resolution used in the render (this grid is also called the "fine grid"). In this example, the fine grid has a resolution sixteen times larger than the coarse grid. That is to say, for each coarse grid pixel there are sixteen corresponding fine grid pixels. One or both of these grids are also shown in FIG. 2B-5C.

The ratio of fine grid pixels to coarse grid pixels (grid ratio) can be identical in the horizontal and vertical directions. Depending on the application or font, it can also be advantageous to choose independent grid ratios in the horizontal and vertical directions. In these examples the horizontal grid ratio is equal to the vertical grid ratio, but these teachings can also be applied to situations where the horizontal grid ratio is different than the vertical grid ratio. Independent horizontal and vertical grid ratios can increase readability and overall size consistency.

Uppercase "I" 201 represents a font outline of a complex character. When rendering a character, this outline is first scaled to the fine grid. As shown in FIG. 2A, the horizontal stems 203 have a uniform width of about 7 high resolution pixels. Likewise, the horizontal counters 205 have a uniform width of about 3.5 high resolution pixels.

Figure 2B:
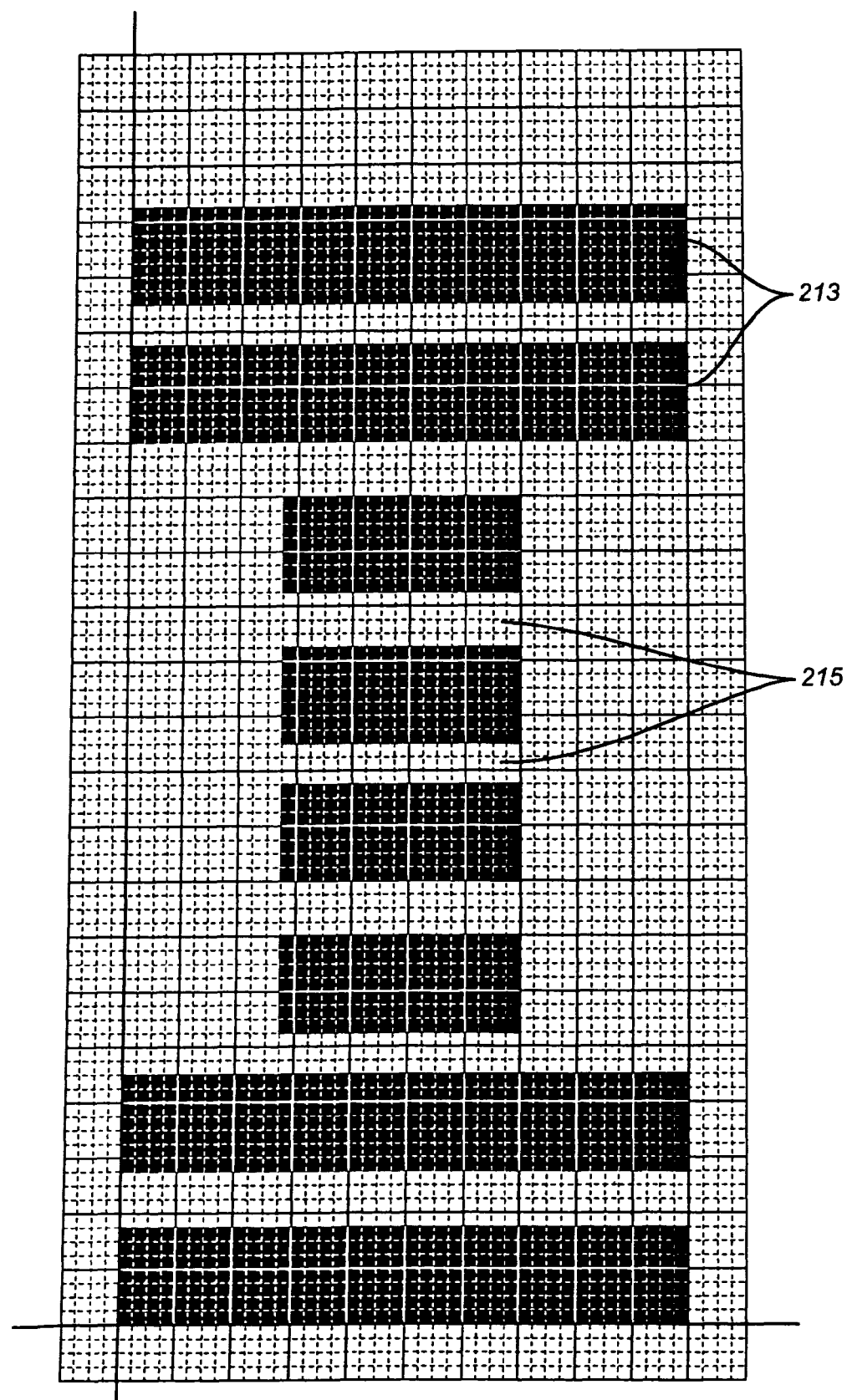
FIG. 2B is a high resolution bitmap of an uppercase "I".

After a character has been scaled to the fine grid, fine grid pixels corresponding to the character outline can be turned on to create a high resolution bitmap of the character. If no correctional transformations, such as stem alignment or counter balancing, are performed, the high resolution bitmap can be created by turning on all fine grid pixels contained within the character outline. The fine grid pixels are monochromatic and can only be turned on or off. For example, FIG. 2B is a high resolution bitmap of an uppercase "I". FIG. 2B shows a high resolution bitmap of the uppercase "I" shown in FIG. 2A. The fine grid pixels contained within the outline of uppercase "I" 201 in FIG. 2A have been turned on. The outline in FIG. 2A has been quantized to the fine grid as shown in FIG. 2B. Horizontal stems 213 have the same fine grid width as horizontal stems 203. As a result of the quantization process, horizontal counters 215 do not have the same fine grid width as horizontal counters 205. The horizontal stems 213 have a uniform width of 7 fine grid pixels, but the horizontal counters 215 have a width of either 3 or 4 fine grid pixels.

Figure 2C:
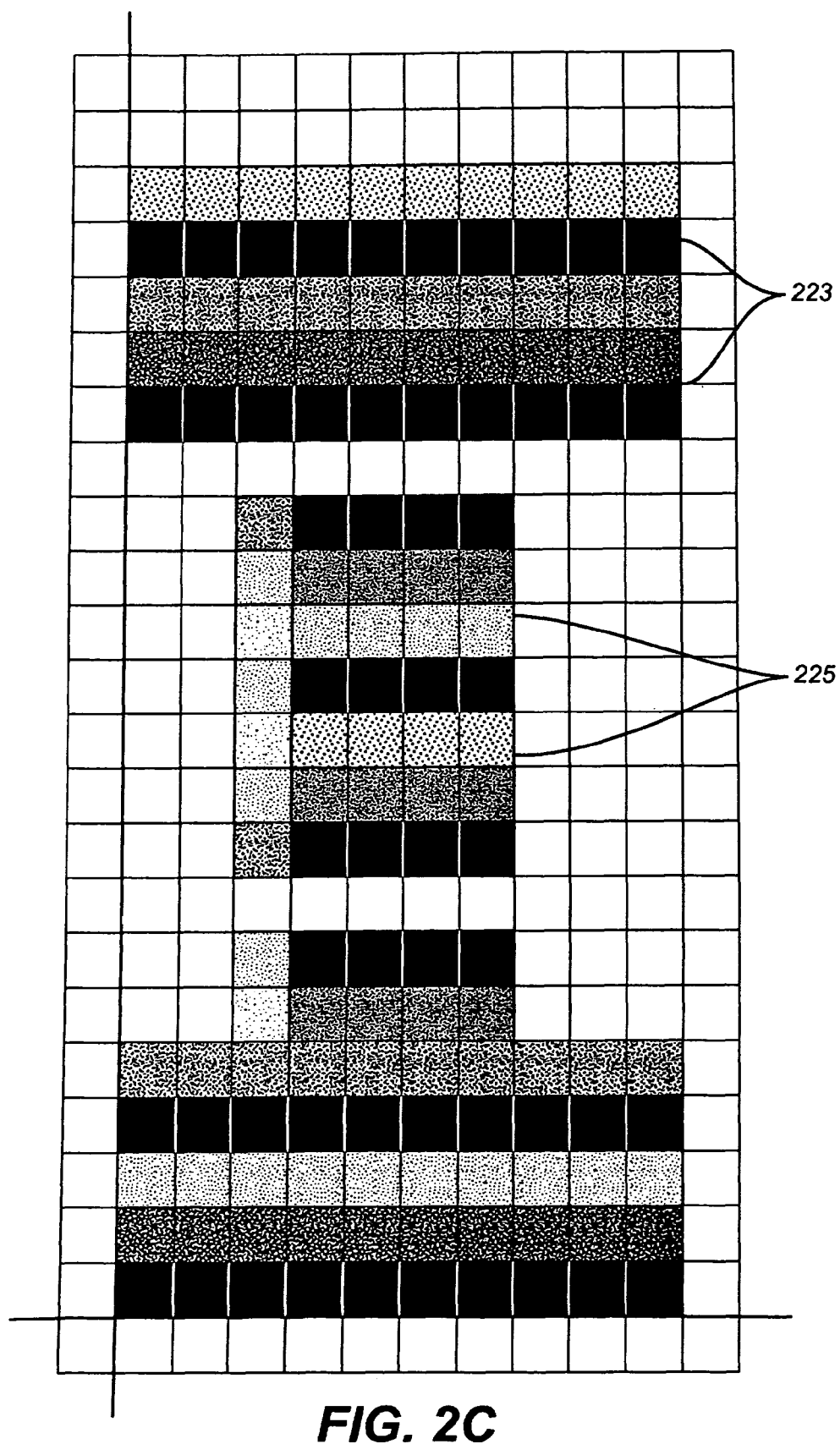
FIG. 2C is a grayscale bitmap at the output resolution of an uppercase "I".

After a high resolution bitmap is created, a grayscale coarse bitmap of the character can be created for display on the output device. Coarse grid pixels can be turned on or off based on the number of corresponding fine grid pixels that were turned on in the high resolution bitmap. Unlike the fine grid pixels, the coarse grid pixels are grayscale pixels and can be turned on to one of several different tones. The tone of each coarse grid pixel is determined by the number of corresponding fine grid pixels that have been turned on. As the number of corresponding high resolution pixels increases, the tone of the coarse grid pixel gets darker. If every corresponding fine grid pixel is turned on, the coarse grid pixel will be black. Likewise, if no corresponding fine grid pixels are turned on, the coarse grid pixel will be white (turned off). For example, FIG. 2C is a grayscale bitmap at the output resolution of an uppercase "I". FIG. 2C shows a grayscale bitmap created from the high resolution bitmap shown in FIG. 2B. The patterns shown in FIG. 2C represent various levels of greyscale tones. The darker patterns represent darker tones and the lighter patterns represent lighter tones. The coarse grid pixels have been turned on based on the corresponding number of fine grid pixels turned on in FIG. 2B. The horizontal stems 213 have been transformed into horizontal stems 223 and the horizontal counters 215 have been transformed into horizontal counters 225. Unlike horizontal stems 213, horizontal stems 223 do not have a uniform width since they have been downsampled to the coarse grid. Likewise, horizontal counters 225 do not have a uniform width. At the output resolution, the horizontal stems 223 vary in width from 2 to 3 pixels and the horizontal counters 225 vary in width from 0 to 1 pixels. This variance can result in a grayscale character that appears blurry or washed out. The variance is shown in horizontal stems 223 and horizontal counters 225. Zero width counters, i.e. counters that contain no white pixels, can decrease a character's readability and appearance. This decrease in readability and appearance is shown in horizontal counters 225.

Figure 3A:
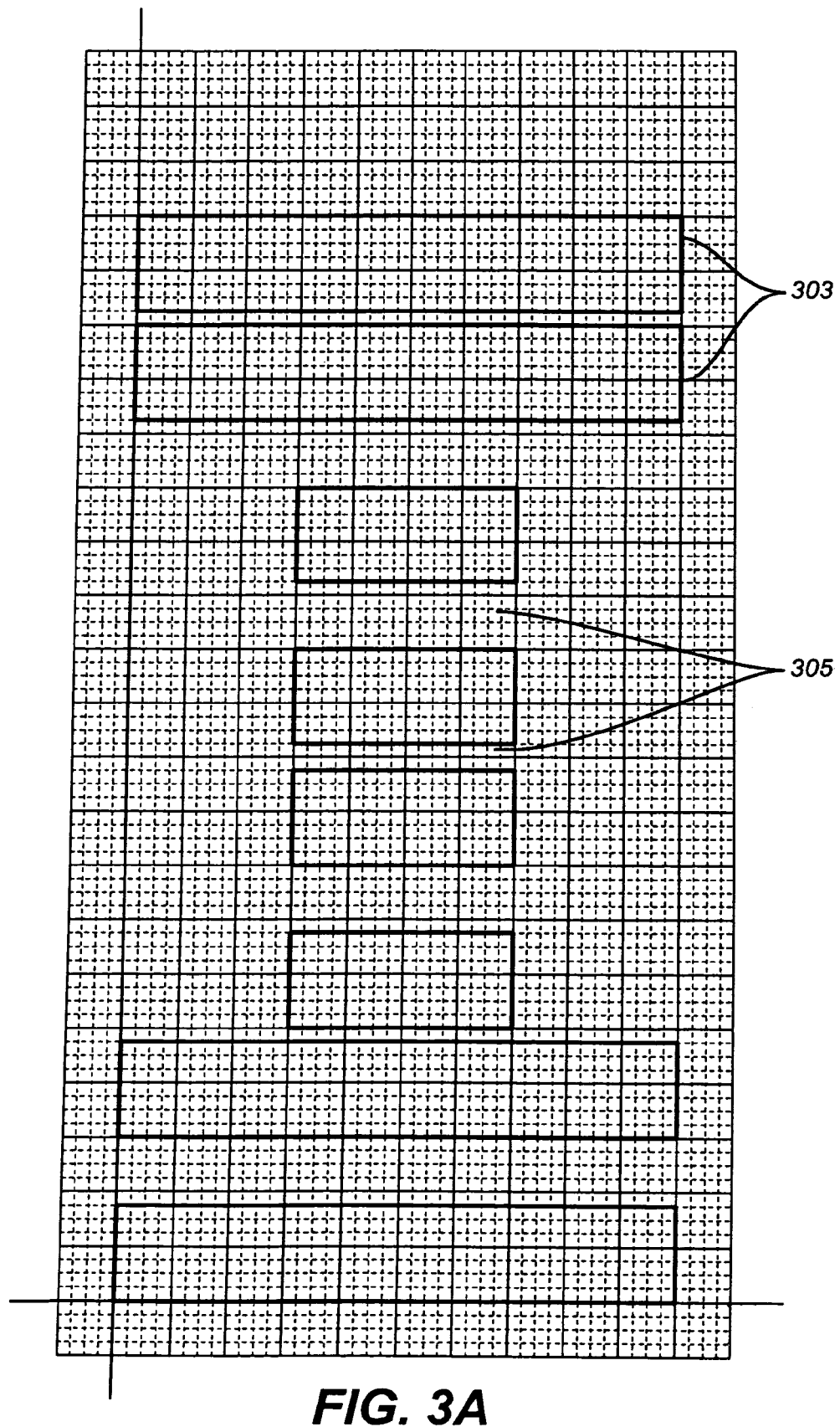
FIG. 3A is an outline of an uppercase "I" after stem alignment with a soft-edge policy (no counter balancing) according to conventional methods.

One conventional method of improving the appearance of a character on an output device is to align the stems of the character with the coarse grid. For example, FIG. 3A is an outline of an uppercase "I" after stem alignment with a soft-edge policy (no counter balancing) according to conventional methods. FIG. 3A shows an outline of the uppercase "I" from FIG. 2A after stem alignment with a soft-edge policy according to conventional methods. The counters have not been balanced. Because the stems have been aligned and the counters have not been balanced, the stems have a uniform width while the counters do not. The horizontal stems 303 have a uniform width identical to that of the horizontal stems 203. However, there is great variance in the width of the horizontal counters 305, unlike the uniformity in the horizontal counters 205. As can be seen in FIG. 3A, the width of the horizontal counters 305 at the fine grid resolution varies from 1 pixel to 6 pixels.

Figure 3B:
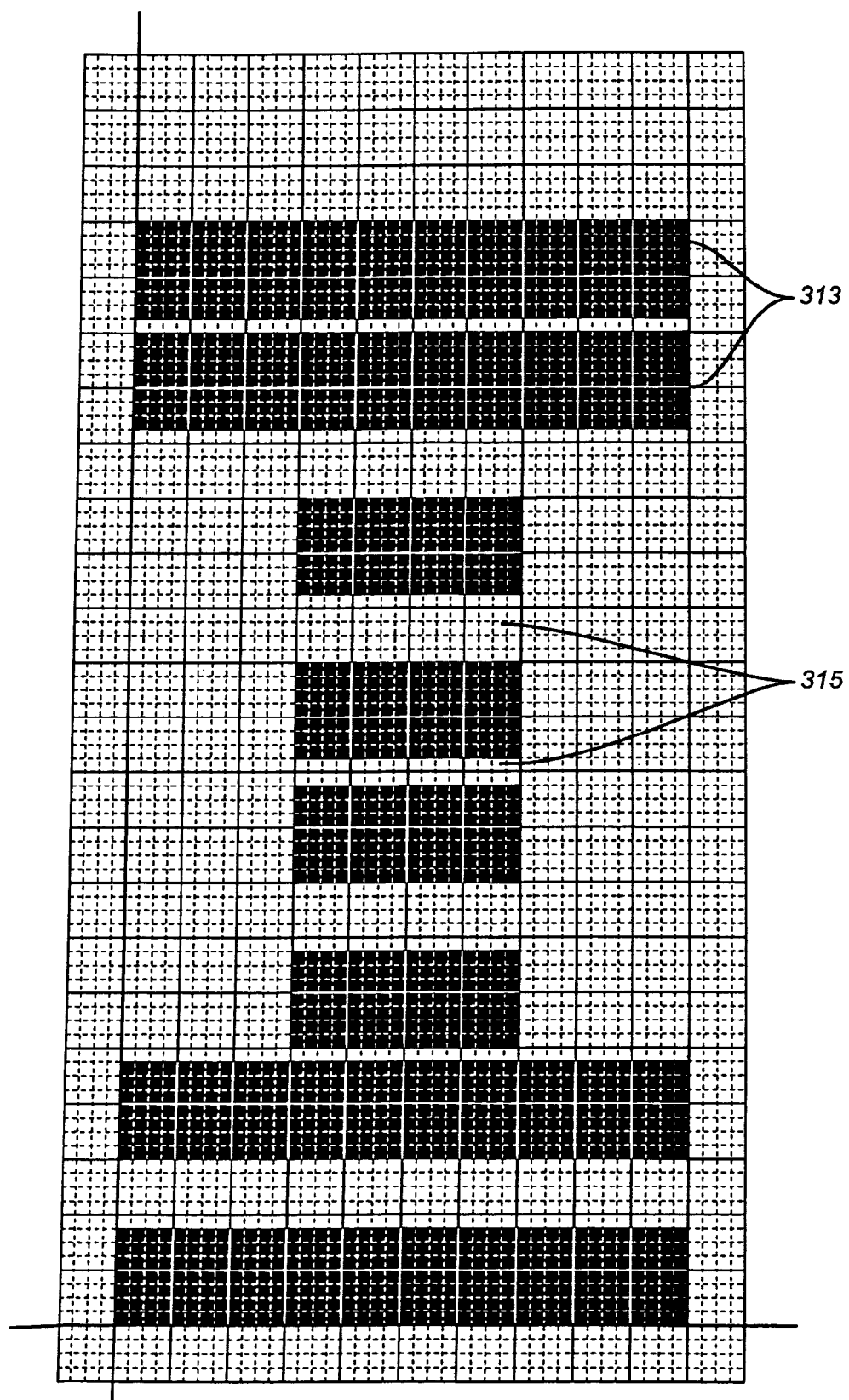
FIG. 3B is a high resolution bitmap of an uppercase "I" after stem alignment with a soft-edge policy (no counter balancing) according to conventional methods.

As described above, the outline of a character can be used to obtain a high resolution bitmap of the character. A character outline can also be changed due to a correctional process such as stem alignment and then used to obtain a high resolution bitmap of the modified character. For example, FIG. 3B is a high resolution bitmap of an uppercase "I" after stem alignment with a soft-edge policy (no counter balancing) according to conventional methods. FIG. 3B shows a high resolution bitmap of the uppercase "I" shown in FIG. 3A. The horizontal stems 313 and horizontal counters 315 correspond to the horizontal stems 303 and horizontal counters 305 and retain the same widths.

Figure 3C:
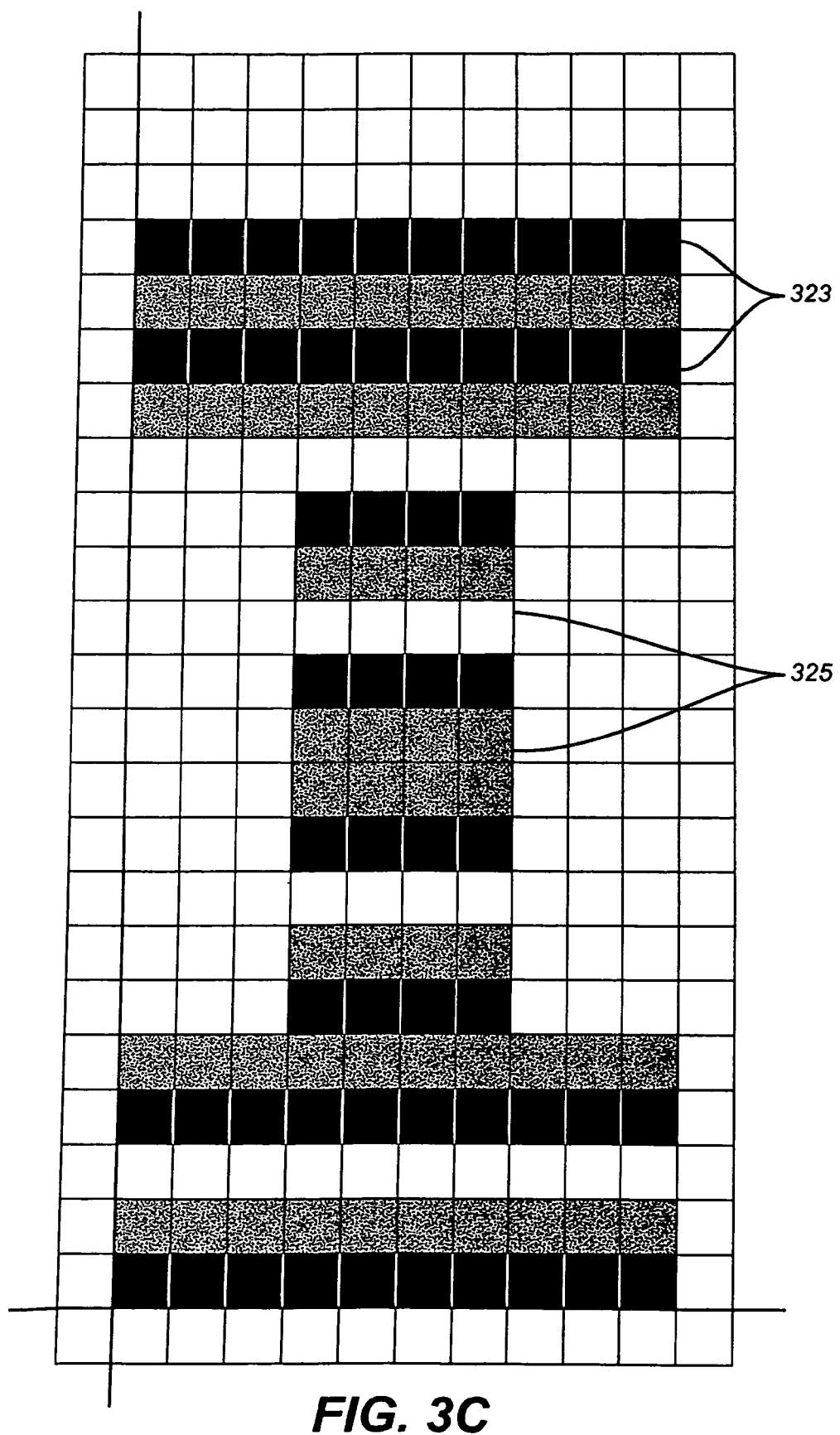
FIG. 3C is a grayscale bitmap at the output resolution of an uppercase "I" after stem alignment with a soft-edge policy (no counter balancing) according to conventional methods.

As described above, a high resolution bitmap of a character can be used to obtain a grayscale bitmap of the character at the output resolution. For example, FIG. 3C is a grayscale bitmap at the output resolution of an uppercase "I" after stem alignment with a soft-edge policy (no counter balancing) according to conventional methods. FIG. 3C shows a grayscale bitmap of the high resolution bitmap shown in FIG. 3B. Although the horizontal stems 323 are aligned vertically and horizontally and have a uniform width at the output resolution, the horizontal counters 325 do not have a uniform width at the output resolution. In fact, four of the counters have a width of 1 coarse grid pixel while three of the counters have a width of 0 coarse grid pixels. The creation of zero width counters results in a distorted version of the original character. This distortion can be seen in horizontal counters 325.

Figure 4A:
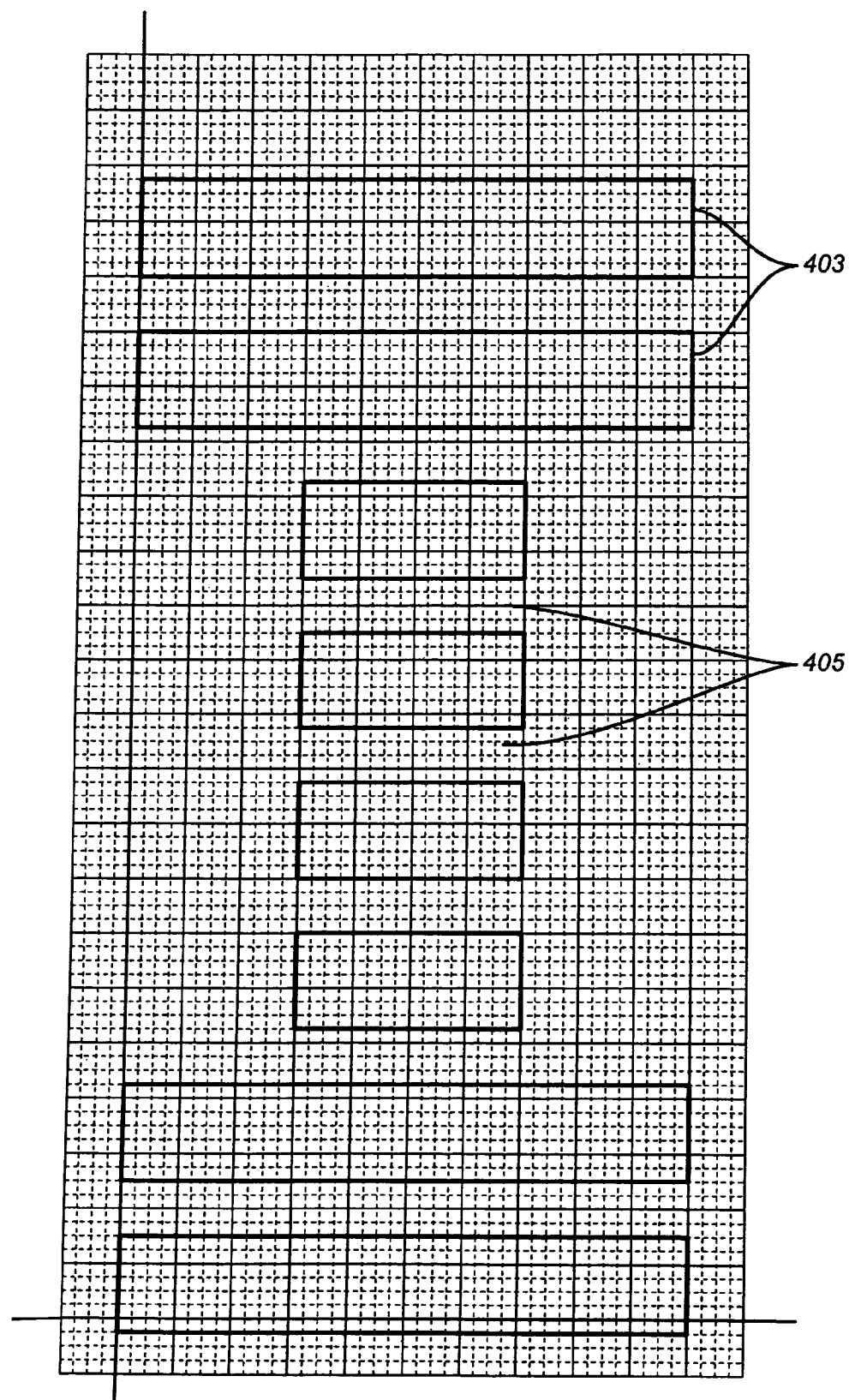
FIG. 4A is an outline of an uppercase "I" after counter balancing (without vertical alignment of the horizontal stems) according to conventional methods.

One conventional method of improving the appearance of a character on an output device is to balance chains of counters of the character. For example, FIG. 4A is an outline of an uppercase "I" after counter balancing (without vertical alignment of the horizontal stems) according to conventional methods. FIG. 4A shows an outline of the uppercase "I" from FIG. 2A after counter balancing according to conventional methods. Conventional counter balancing is based on fine grid increments and does not consider the coarse grid. Therefore, conventional counter balancing can create counters that are balanced with respect to the fine grid, but are not balanced with respect to the coarse grid. Counter balancing, like stem alignment, can be carried out vertically and/or horizontally. In the example, the horizontal stems 403 have uniform width but are not vertically aligned to the coarse grid. The horizontal stems 403 have a uniform width of 7 fine grid pixels and the horizontal counters 405 have a uniform width of 4 fine grid pixels.

Figure 4B:
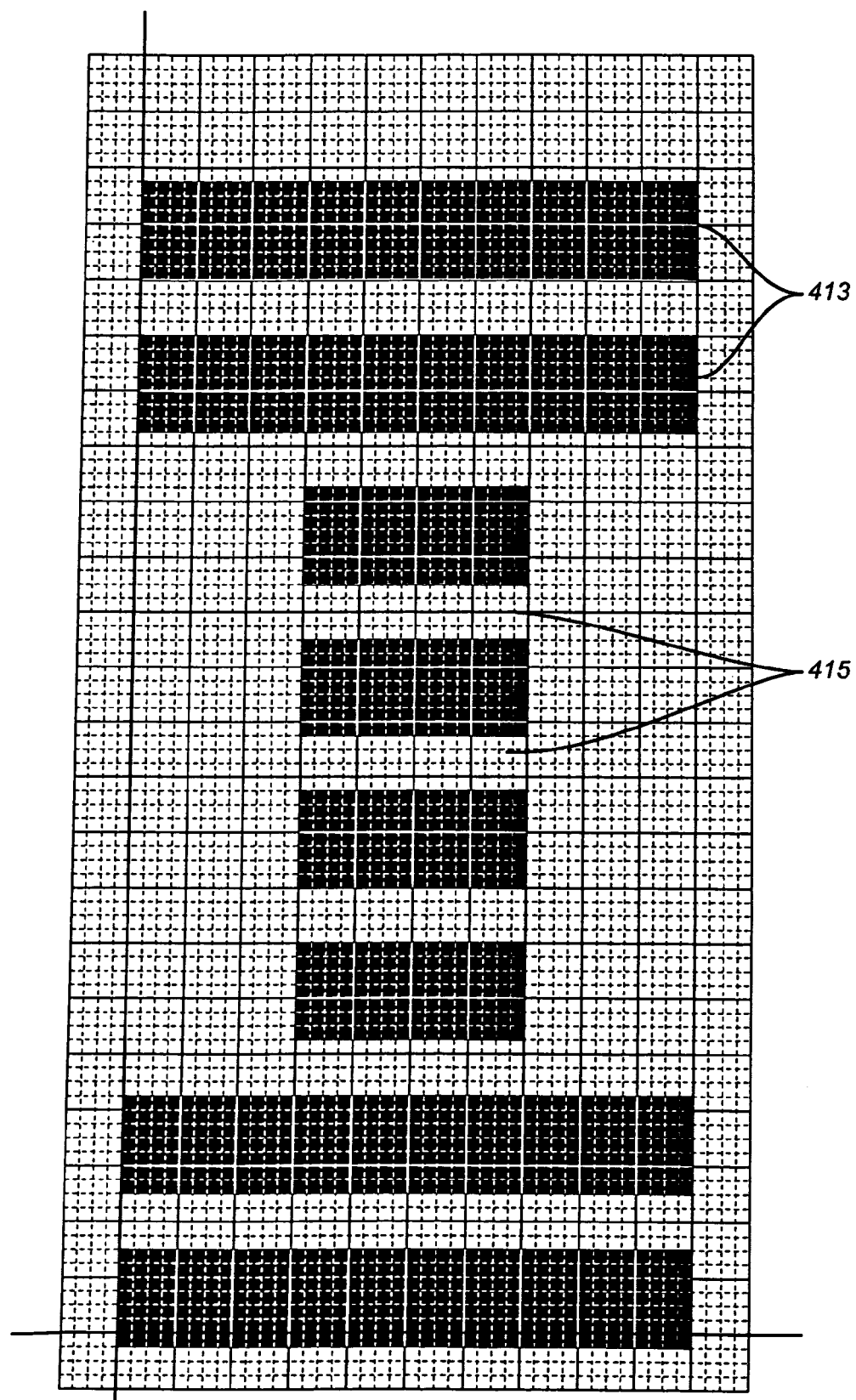
FIG. 4B is a high resolution bitmap of an uppercase "I" after counter balancing (without vertical alignment of the horizontal stems) according to conventional methods.

As described above, the outline of a character can be used to obtain a high resolution bitmap of the character. A character outline can also be changed due to a correctional process such as counter balancing and then used to obtain a high resolution bitmap of the modified character. For example, FIG. 4B is a high resolution bitmap of an uppercase "I" after counter balancing (without vertical alignment of the horizontal stems) according to conventional methods. FIG. 4B shows a high resolution bitmap of the uppercase "I" shown in FIG. 4A. The horizontal stems 413 and horizontal counters 415 correspond to the horizontal stems 403 and horizontal counters 405 and retain the same widths.

Figure 4C:
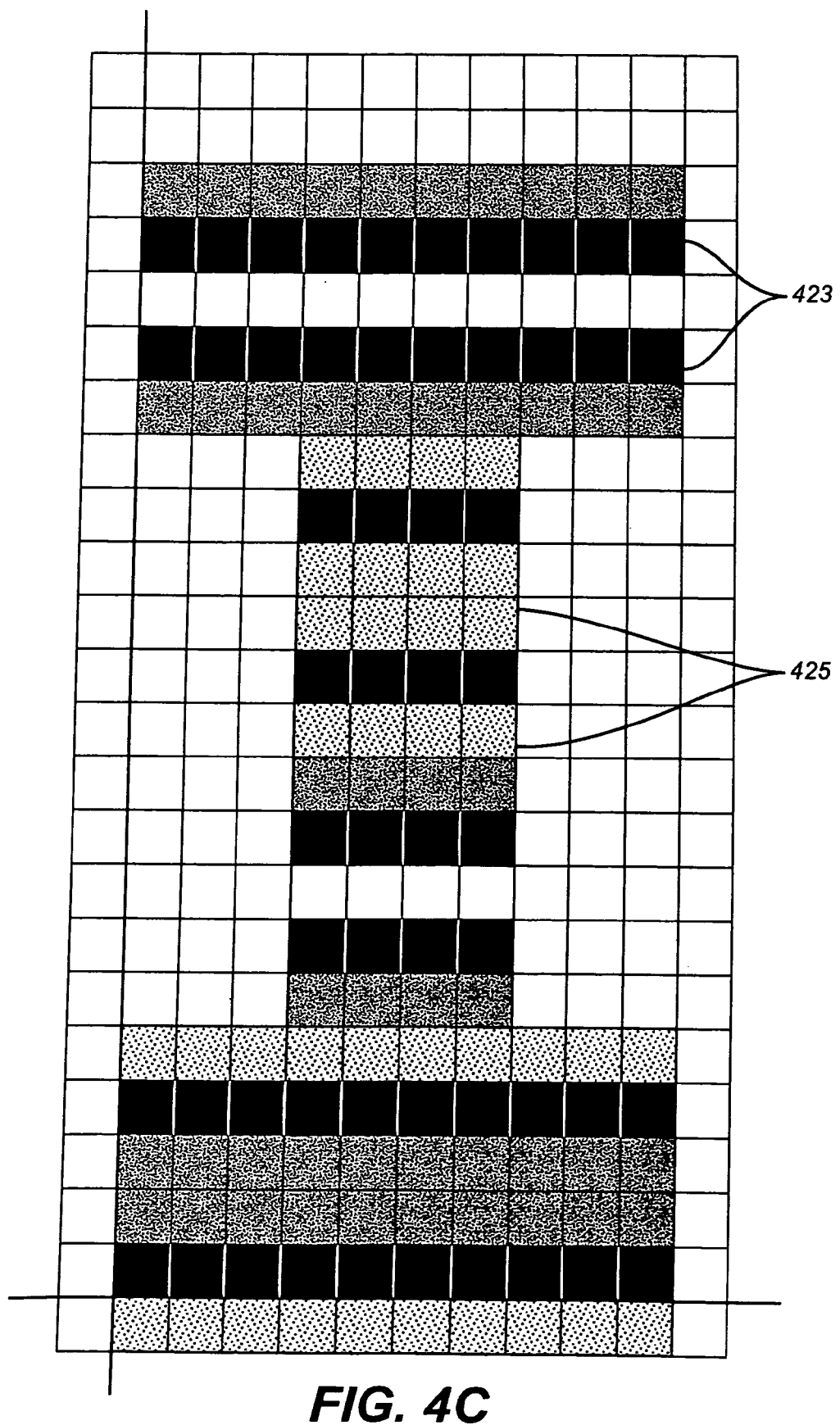
FIG. 4C is a grayscale bitmap at the output resolution of an uppercase "I" after counter balancing (without vertical alignment of the horizontal stems) according to conventional methods.

As described above, a high resolution bitmap of a character can be used to obtain a grayscale bitmap of the character at the output resolution. For example, FIG. 4C is a grayscale bitmap at the output resolution of an uppercase "I" after counter balancing (without vertical alignment of the horizontal stems) according to conventional methods. FIG. 4C shows a grayscale bitmap of the uppercase "I" shown in FIG. 4B. Counter balancing at the fine grid resolution does not align the stems or counters with coarse grid pixels. Therefore, the grayscale bitmap sent to the output device does not have counters and stems with uniform widths. For example, at the output resolution, neither the horizontal stems 423 nor the horizontal counters 425 have a uniform width. The width of the horizontal stems 423 varies from 2 coarse grid pixels to 3 coarse grid pixels. This variation in stem width can result in a character that is blurry and difficult to read. This blurriness can be seen in horizontal stems 423. The width of the horizontal counters 425 varies from 1 coarse grid pixel to 0 coarse grid pixels. This distortion and the creation of zero width counters results in a character that appears blurry and has decreased readability. The distortion and decreased readability can be seen in the horizontal counters 425.

Figure 5A:
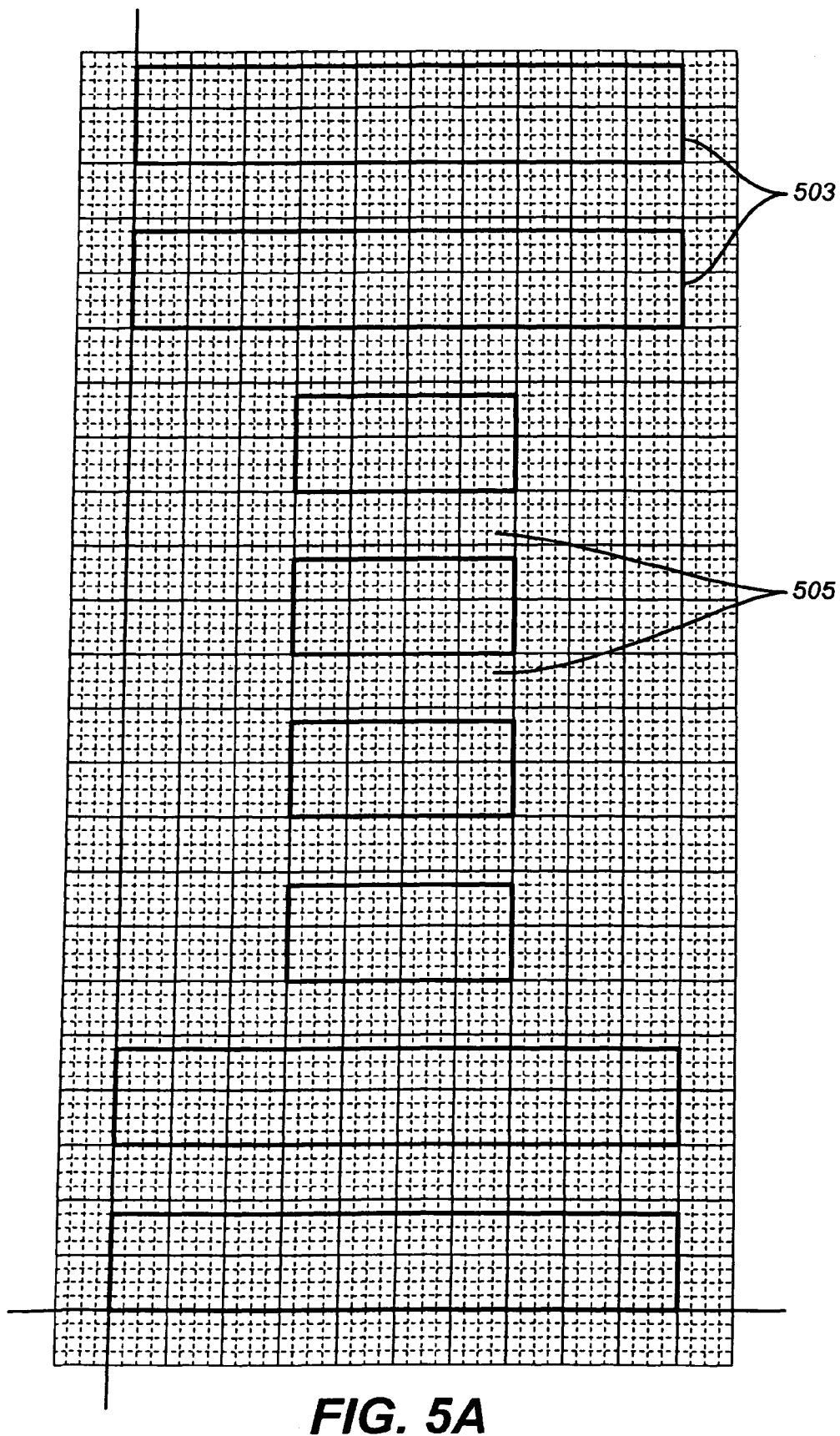
FIG. 5A is an outline of an uppercase "I" after concurrent stem alignment with a directional-edge policy and counter balancing.

As shown in the present disclosure, it can be beneficial to perform concurrent stem alignment and counter balancing. This process can improve the appearance and readability of the character. Any stem alignment policy can be used, but for some complex characters, a directional-edge can be preferable. For example, FIG. 5A is an outline of an uppercase "I" after concurrent stem alignment with a directional-edge policy and counter balancing. FIG. 5A shows an outline of the uppercase "I" from FIG. 2A after concurrent stem alignment with a directional-edge policy and counter balancing. When stem alignment and counter balancing are performed concurrently the relative widths of the horizontal stems and horizontal counters are preserved. The counters are also aligned to the coarse grid which improves their appearance and enhances readability. Both the stems and counters of the uppercase "I" in FIG. 5A have uniform widths. The horizontal stems 503 have a uniform width of 7 fine grid pixels and the horizontal counters 505 have a uniform width of 5 fine grid pixels. This uniform appearance and the alignment of the counters to the coarse grid improves the look and readability of the character after it has been converted to grayscale as demonstrated below.

Figure 5B:
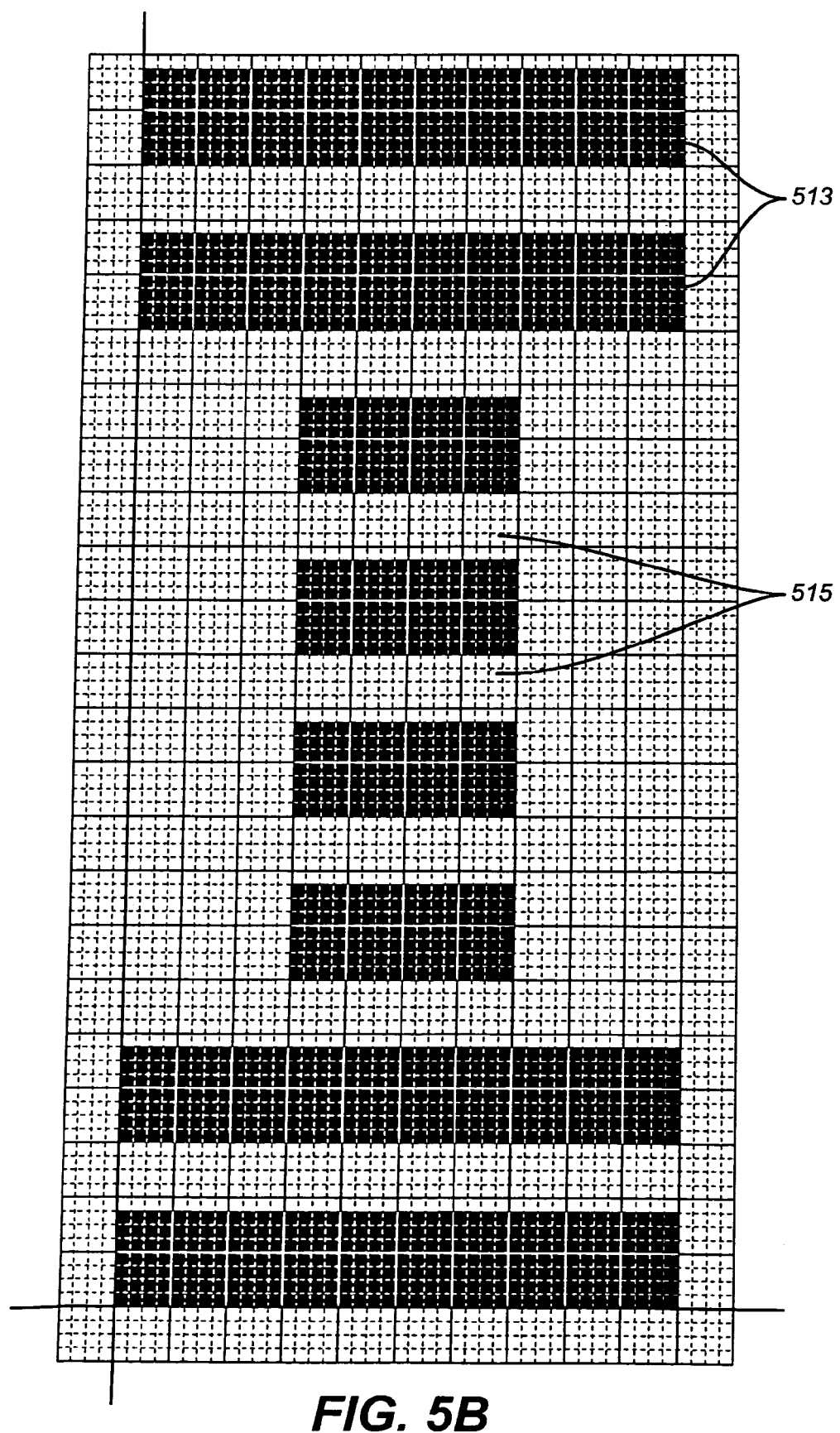
FIG. 5B is a high resolution bitmap of an uppercase "I" after concurrent stem alignment with a directional-edge policy and counter balancing.

As described above, the outline of a character can be used to obtain a high resolution bitmap of the character. A character outline can also be changed due to a correctional process such as concurrent stem alignment and counter balancing and then used to obtain a high resolution bitmap of the modified character. For example, FIG. 5B is a high resolution bitmap of an uppercase "I" after concurrent stem alignment with a directional-edge policy and counter balancing. FIG. 5B shows a high resolution bitmap of the uppercase "I" shown in FIG. 5A. The horizontal stems 513 and horizontal counters 515 correspond to the horizontal stems 503 and horizontal counters 505 and retain the same widths.

Figure 5C:
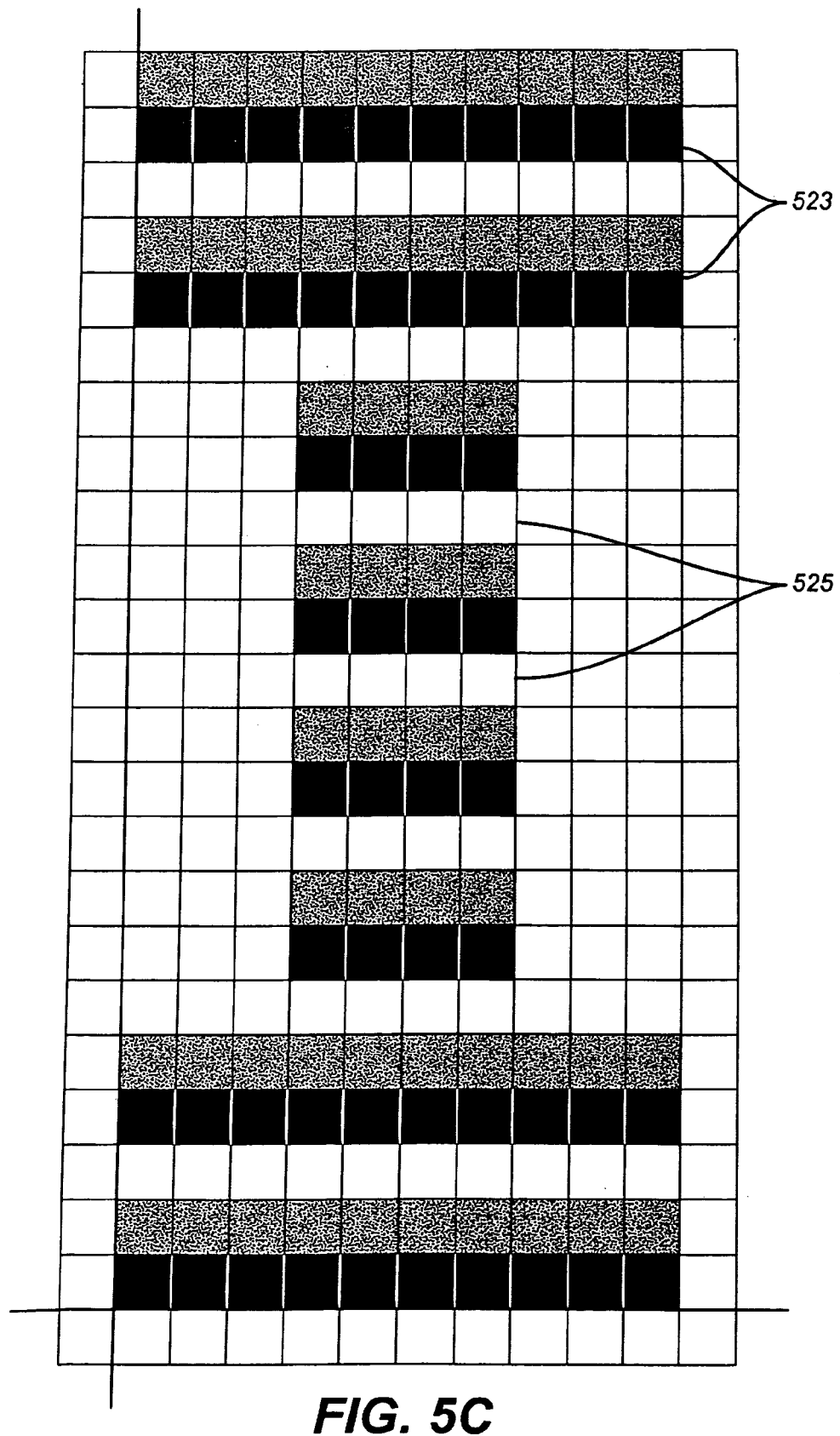
FIG. 5C is a grayscale bitmap at the output resolution of an uppercase "I" after concurrent stem alignment with a directional-edge policy and counter balancing.

As described above, a high resolution bitmap of a character can be used to obtain a grayscale bitmap of the character at the output resolution. For example, FIG. 5C is a grayscale bitmap at the output resolution of an uppercase "I" after concurrent stem alignment with a directional-edge policy and counter balancing. FIG. 5C shows a grayscale bitmap of the uppercase "I" shown in FIG. 5B. By following this method, the grayscale rendering of the uppercase "I" is no longer blurry or washed out. In addition, due to the directional-edge policy the vertical orientation of the horizontal stems 523 is consistent which creates a more visually pleasing rendering of the original character. In this example, the horizontal stems 523 have been aligned to the bottom which results in a row of black coarse grid pixels on the bottom of each horizontal stem 523. Even at the output resolution, both the horizontal stems 523 and the horizontal counters 525 retain uniform widths. The horizontal stems 523 have a uniform width of 2 device pixels and the horizontal counters 525 have a uniform width of 1 device pixel. The uniformity amongst the horizontal stems 203 and horizontal counters 205 of FIG. 2A is preserved in the horizontal stems 523 and the horizontal counters 525.

When performing stem alignment, many possible stem-alignment policies can be used. Conventional stem alignment policies such as a hard-edge policy, a soft-edge policy, a black-edge policy, or a minimum-bias policy can be employed. For improved results, the newly developed directional-edge policy can also be used. The directional-edge policy is a policy created for the combination of stem alignment and counter balancing. It is similar to the soft-edge policy except that it has a consistent direction bias perpendicular to the stems and counters. For horizontal stems, the bias direction can be top or bottom. For vertical stems, the bias direction can be right or left. The directional-edge policy can create a more uniform and balanced result for complex characters than that achieved by conventional stem-alignment policies. For example, FIG. 5C shows the result of the directional-edge policy. Each of the horizontal stems 523 are composed of a row of black pixels on the bottom and a row of gray pixels on the top. This orientation can be contrasted with FIG. 3C. In FIG. 3C, the horizontal stems 525 have been aligned with a soft-edge policy which results in half of the stems having black rows on the bottom and gray rows on the top and half of the stems having black rows on the top and gray rows on the bottom. The soft-edge policy creates an artificial line of symmetry in the middle of the figure and as a result the top and bottom rows of pixels are black. While this policy works well for simple characters with symmetry and relatively complete coverage of the edges of the pixel map, many complex characters lack these axes of symmetry and have relatively incomplete coverage of the edges of the pixel map. Therefore, a directional-edge policy may give a more uniform appearance and may result in an increase in character readability for complex characters.

When concurrently performing stem alignment and counter balancing, the character will often be expanded or shrunk in order to retain the relative widths of the stems and counters. Unfettered expansion and shrinkage are undesirable for two reasons. First, the original target size of the character can be lost in the process. Second, the amount by which each character expands or shrinks is frequently different than the amount by which the characters before and after it expand or shrink. This difference can lead to a non-uniform appearance.

In order to limit the expansion and shrinkage of complex characters being rendered, some embodiments of this invention can employ an expansion factor that limits the total expansion or shrinkage of the character. The expansion factor can be applied to a group of characters, such as a font, to create a more uniform appearance across the members of the group.

Figure 7:
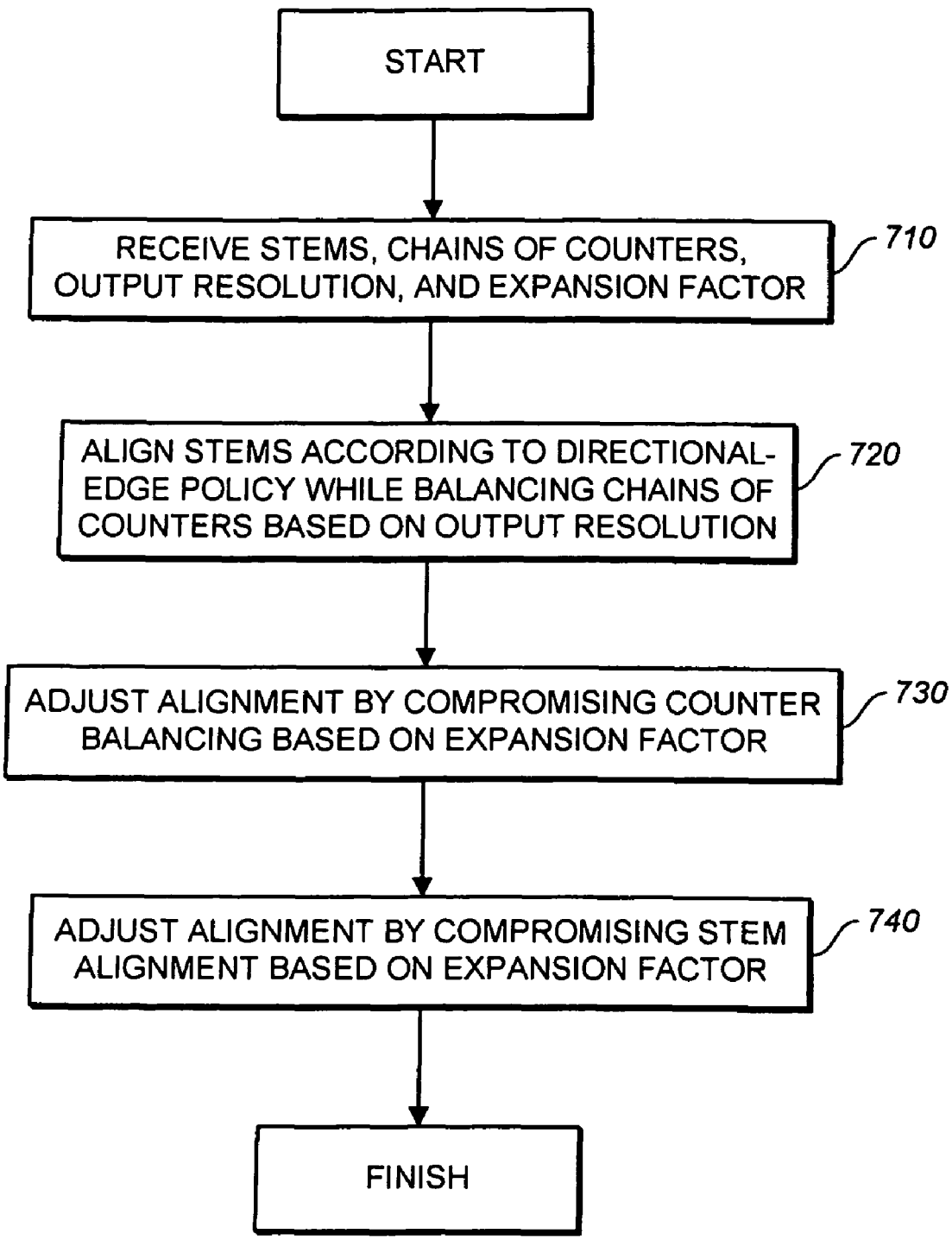
FIG. 7 is a flow chart showing the use of an expansion factor to adjust alignment.

The expansion factor alters the alignment of stems and the balancing of counters by limiting the amount the character can expand or contract. For example, FIG. 7 is a flow chart showing the use of an expansion factor to adjust alignment. FIG. 7 shows the use of an expansion factor to adjust the alignment of stems and balancing of counters. Stems, chains of counters, an output resolution, and the expansion factor can be received at 710. The stems are aligned at 720 according to an alignment policy, such as the directional-edge policy while the chains of counters are concurrently balanced based on the output resolution. The alignment is adjusted at 730 by compromising the counter balancing based on the expansion factor. If the new character size exceeds the threshold established by the expansion factor, i.e. the character has become too large or too small, the alignment is first adjusted by allowing distortion in the counter balancing. If this adjustment is insufficient to bring the character size within the threshold established by the expansion factor, then the adjustment is continued by compromising stem alignment at 740 based on the expansion factor.

The expansion factor can range from 0%, which prevents all changes in size of the character, to 100%, which allows unlimited size adjustments of the character. The ideal expansion factor typically changes depending on the font, but for most fonts an expansion factor of between 5% and 7% may be optimal. An expansion factor of 6% may be ideal for most fonts including Chinese hanzi, Japanese kanji, and Korean hanja and hangul fonts. This expansion factor is a compromise between the goal of aligned stems and balanced counters and the goal of overall size consistency among the characters in a font. Changes to the expansion factor will favor one of these goals at the expense of the other. Depending on the application and the font, it may be desirable to decrease the expansion factor to improve overall size consistency.

The expansion factor can also be chosen independently for the horizontal and vertical directions. A separate expansion factor for each direction can be desirable depending on the application and font. In these examples the horizontal expansion factor is equal to the vertical expansion factor, but these teachings can also be applied to situations where the horizontal expansion factor is different than the vertical expansion factor. Independent horizontal and vertical expansion factors can increase readability and overall size consistency.

As shown, the uppercase "I" 201 in FIG. 2A is expanded when stem alignment and counter balancing are concurrently performed and therefore the uppercase "I" in FIG. 5A is markedly larger in height. To better show the effect of concurrent stem alignment and counter balancing, the expansion factor in this example was chosen to be 100%, which allows unfettered expansion and shrinkage of the character. A smaller value would limit the possible expansion or shrinkage and result in a character more similar in size to the original outline.

Additionally, when concurrently performing stem alignment and counter balancing with the additional limitation of an expansion factor, it may be preferable to expand the character rather than shrink the character. If the character is shrunk instead of expanded, it will be harder to read. Also, the possibility exists that the character will be shrunk to have a dimension of 0 device pixels.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) monitor, an LCD (liquid crystal display) monitor, an OLED (organic light-emitting diode) monitor, or a printer, or for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The computing system can include a document handling application that performs the operations described herein. Examples of document handling applications include Adobe® Acrobat® and Adobe® Reader® by Adobe Systems Incorporated of San Jose, Calif. An electronic document does not necessarily correspond to a file. A document may be stored in a portion of a file that holds other documents, in a single file dedicated to the document in question, or in multiple coordinated files.

Figure 6:
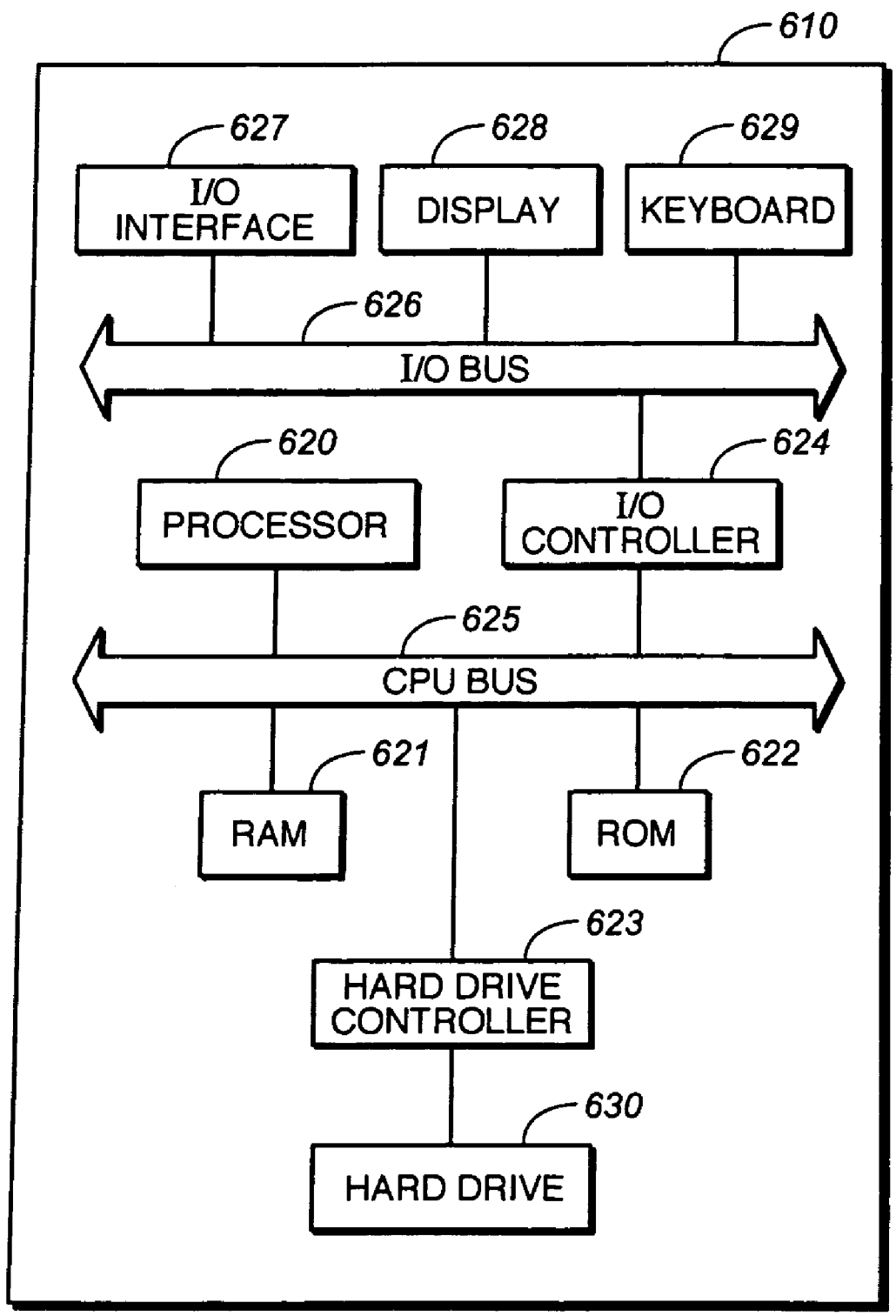
FIG. 6 is a block diagram of a programmable computer that is a suitable host for the method and apparatus of the present disclosure.

An example of one such type of computer is shown in FIG. 6, which shows a block diagram of a programmable processing system (system) 610 suitable for implementing or performing the apparatus or methods of the invention. The system 610 includes a processor 620, a random access memory (RAM) 621, a program memory 622 (for example, a writable read-only memory (ROM) such as a flash ROM), a hard drive controller 623, and an input/output (I/O) controller 624 coupled by a processor (CPU) bus 625. The system 610 can be preprogrammed, in ROM, for example, or it can be programmed (and reprogrammed) by loading a program from another source (for example, from a floppy disk, a CD-ROM, or another computer).

The hard drive controller 623 is coupled to a hard disk 630 suitable for storing executable computer programs, including programs embodying the present disclosure, and data including characters and font programs.

The I/O controller 624 is coupled by means of an I/O bus 626 to an I/O interface 627. The I/O interface 627 receives and transmits data (e.g., stills, pictures, movies, and animations for importing into a composition) in analog or digital form over communication links such as a serial link, local area network, wireless link, and parallel link.

Also coupled to the I/O bus 626 is a display 628 and a keyboard 629. Alternatively, separate connections (separate buses) can be used for the I/O interface 627, display 628 and keyboard 629.

Particular embodiments of the invention have been described. Other embodiments are within the scope of the following claims. For example, the actions recited in the claims can be performed in a different order and still achieve desirable results.

What is claimed is:

1. A method comprising:
   receiving a character including stems, the character having an associated output resolution and an associated output bit depth;
   grouping counters defined by the stems of the character into a chain of counters;
   aligning the stems of the character based on a stem alignment policy while balancing the chain of counters based on the output resolution;
   creating a pixel map of the character at the output resolution and the output bit depth based on the aligned stems; and
   adjusting the aligning of the stems and the balancing the chain of counters based on an expansion factor, which limits an amount the character can expand or contract, of from 5% to 7%,
   wherein the receiving, the grouping, the aligning and the creating are performed by at least one processor,
   the output resolution is represented by a coarse grid that corresponds to a portion of an output device resolution allocated to the character,
   the coarse grid has a lower resolution than a fine grid,
   the fine grid has a lower resolution than a character space of a font outline in which the character is defined, and
   the character is scaled down from the font outline to the fine grid and then downsampled from the fine grid to the coarse grid before presentation on the output device, and
   wherein aligning the stems of the character based on a stem alignment policy comprises aligning the stems of the character to the output resolution in a bias direction consistent with an orientation of the stems.

2. The method of claim 1, wherein the output resolution comprises:
   a vertical output resolution and a horizontal output resolution.

3. A non-transitory machine-readable storage device storing a computer program product, the computer program product having instructions operable to cause one or more data processing apparatus to perform operations comprising:
   receiving a character including stems, the character having an associated output resolution and an associated output bit depth;
   grouping counters defined by the stems of the character into a chain of counters;
   aligning the stems of the character based on a stem alignment policy while balancing the chain of counters based on the output resolution;
   creating a pixel map of the character at the output resolution and the output bit depth based on the aligned stems; and
   adjusting the aligning of the stems and the balancing the chain of counters based on an expansion factor, which limits an amount the character can expand or contract, of from 5% to 7%,
   wherein the output resolution is represented by a coarse grid that corresponds to a portion of an output device resolution allocated to the character,
   the coarse grid has a lower resolution than a fine grid,
   the fine grid has a lower resolution than a character space of a font outline in which the character is defined, and
   the character is scaled down from the font outline to the fine grid and then downsampled from the fine grid to the coarse grid before presentation on the output device, and
   wherein aligning the stems of the character based on a stem alignment policy comprises aligning the stems of the character to the output resolution in a bias direction consistent with an orientation of the stems.

4. The storage device of claim 3, wherein the output resolution comprises:
   a vertical output resolution and a horizontal output resolution.

5. A system comprising:
   a processor; and
   a machine-readable storage device storing a computer program product, including a document handling application, operable to cause the processor to perform operations comprising:
   receiving a character including stems, the character having an associated output resolution and an associated output bit depth;
   grouping counters defined by the stems of the character into a chain of counters;
   aligning the stems of the character based on a stem alignment policy while balancing the chain of counters based on the output resolution;
   creating a pixel map of the character at the output resolution and the output bit depth based on the aligned stems; and
   adjusting the aligning of the stems and the balancing the chain of counters based on an expansion factor, which limits an amount the character can expand or contract, of from 5% to 7%,
   wherein the output resolution is represented by a coarse grid that corresponds to a portion of an output device resolution allocated to the character, the coarse grid has a lower resolution than a fine grid,
the fine grid has a lower resolution than a character space of a font outline in which the character is defined, and
the character is scaled down from the font outline to the fine grid and then downsampled from the fine grid to the coarse grid before presentation on the output device, and
wherein aligning the stems of the character based on a stem alignment policy comprises aligning the stems of the character to the output resolution in a bias direction consistent with an orientation of the stems.

6. The system of claim 5, wherein the output resolution comprises:
a vertical output resolution and a horizontal output resolution.

* * * * *

UNITED STATES PATENT AND TRADEMARK OFFICE
CERTIFICATE OF CORRECTION

| | | |
|---|---|---|
| PATENT NO. | : 7,868,888 B2 | Page 1 of 1 |
| APPLICATION NO. | : 11/541219 | |
| DATED | : January 11, 2011 | |
| INVENTOR(S) | : Terence S. Dowling | |

It is certified that error appears in the above-identified patent and that said Letters Patent is hereby corrected as shown below:

On the title page item (54), delete "COURSE" and replace with --COARSE--;

At column 1, line 1, delete "COURSE" and replace with --COARSE--.

Signed and Sealed this
Twenty-second Day of March, 2011

David J. Kappos
*Director of the United States Patent and Trademark Office*